(12) United States Patent
Miyajima (10) Patent No.: US 7,612,521 B2
(45) Date of Patent: Nov. 3, 2009

(54) MOTOR DRIVING APPARATUS

(75) Inventor: Satoshi Miyajima, Kyoto (JP)

(73) Assignee: Rohm Co., Ltd. (JP)

( * ) Notice: Subject to any disclaimer, the term of this patent is extended or adjusted under 35 U.S.C. 154(b) by 43 days.

(21) Appl. No.: 11/794,080

(22) PCT Filed: Dec. 9, 2005

(86) PCT No.: PCT/JP2005/022627

§ 371 (c)(1),
(2), (4) Date: Jun. 22, 2007

(87) PCT Pub. No.: WO2006/067975

PCT Pub. Date: Jun. 29, 2006

(65) Prior Publication Data

US 2008/0044165 A1 Feb. 21, 2008

(30) Foreign Application Priority Data

Dec. 22, 2004 (JP) ............................. 2004-372244

(51) Int. Cl.
*H02P 23/00* (2006.01)
(52) U.S. Cl. ..................... 318/819; 318/634; 318/641; 318/400.08
(58) Field of Classification Search ................. 318/819, 318/634, 641, 400.08
See application file for complete search history.

(56) References Cited

U.S. PATENT DOCUMENTS 6,824,362 B2 * 11/2004 Dodson, III ................... 417/22

FOREIGN PATENT DOCUMENTS

| JP | 63-268487 | 11/1988 |
|----|-----------|---------|
| JP | 7-31190 | 1/1995 |
| JP | 11-69858 | 3/1999 |
| JP | 2001-284868 | 10/2001 |

OTHER PUBLICATIONS

International Search Report for International Application No. PCT/JP2005/022627 dated Jan. 17, 2006.
Written Opinion of the International Searching Authority for International Application No. PCT/JP2005/022627.

* cited by examiner

*Primary Examiner*—Walter Benson
*Assistant Examiner*—Renata McCloud
(74) *Attorney, Agent, or Firm*—Cantor Colburn LLP (57) ABSTRACT

In a fan motor drive circuit which drives a motor based on a pulse-modulated external control signal, a temperature control signal generator generates a pulse-modulated temperature control signal whose duty ratio changes depending on temperature. A signal synthesizer synthesizes the external control signal and the temperature control signal by a logical operation. A drive controller drives the motor based on output of the signal synthesizer.

8 Claims, 8 Drawing Sheets

MOTOR DRIVING APPARATUS

CROSS REFERENCE TO RELATED APPLICATIONS

This is a U.S. national stage of application No. PCT/JP2005/022627, filed on 9 Dec. 2005. Priority under 35 U.S.C. §119(a) and 35 U.S.C. §365(b) is claimed from Japanese Application No. 2004-372244, filed 22 December 2004, the disclosures of which are also incorporated herein by reference.

BACKGROUND OF THE INVENTION

1. Field of the Invention

The present invention relates to a motor driving apparatus.

2. Description of the Related Art

With the speeding up of personal computers and workstations of recent years, operation speeds of LSIs (Large Scale Integrated circuits) for computation, such as CPUs (Central Processor Units), DSPs (Digital Signal Processors), and the like, are increasing.

In such LSIs, as the operation speeds thereof, that is, clock frequencies, become higher, generated amounts of generated heat become large. There is a problem in that the generated heat from an LSI leads to thermorunaway of the LSI itself, or has an impact on surrounding circuits. Consequently, appropriate thermal cooling of LSIs is a very important technology.

As one example of technology for cooling an LSI, there is a cooling method of air-cooling by a cooling fan. In this method, for example, the cooling fan is arranged opposite a surface of the LSI, and cooling air is blown on the LSI surface by the cooling fan. When the LSI is cooled by such a cooling fan, temperature near the LSI is monitored and level of cooling is adjusted by changing rotation of the fan in accordance with the temperature thereof (Patent Documents 1 and 2).

Patent Document 1: Japanese Patent Application, Laid Open No. H7-31190

Patent Document 2: Japanese Patent Application, Laid Open No. 2001-284868

However, there are cases in which the generated amounts of heat of an LSI, the temperature thereof, a threshold temperature for thermorunaway, and the like, differ for every LSI. Consequently, it is desirable to be able to flexibly set rotation speed of a cooling fan in accordance with an LSI that is to be cooled.

SUMMARY OF THE INVENTION

The present invention was made in light of these types of problems and has as a general purpose the provision of a fan motor driving apparatus and a cooling apparatus, in which number of rotations (frequency) of a cooling fan motor can be flexibly set in accordance with temperature and, and an object, which is to be cooled, can be cooled at a desired level.

An embodiment of the present invention relates to a motor driving apparatus. The motor driving apparatus which drives a motor based on a pulse-modulated external control signal inputted from outside, is provided with a temperature control signal generator which generates a pulse-modulated temperature control signal whose duty ratio changes depending on temperature, a signal synthesizer which synthesizes the external control signal and the temperature control signal, and a drive controller which drives the motor based on output of the signal synthesizer.

"Pulse-modulated" refers to pulse width modulation, pulse density modulation, pulse frequency modulation, or the like, and "duty ratio" refers to a ratio of a high level time and a cycle time.

According to this embodiment, the duty ratio of a control signal, obtained by synthesizing the temperature control signal and the external control signal in the signal synthesizer, has a value that reflects a duty ratio of the external control signal and a duty ratio dependent on the temperature, so that it is possible to control the frequency of the motor in accordance with the temperature and an instruction from outside.

The temperature control signal generator may be provided with a periodic signal generator which generates a periodic signal whose frequency is proportional to frequency of the motor, a temperature detector which generates a temperature detection voltage in which a voltage value changes depending on temperature, and a voltage comparator which compares the periodic signal and the temperature detection voltage, and may generate the temperature control signal based on output of the voltage comparator. With the temperature detection voltage as a threshold value, by setting a time-period in which the periodic signal is higher than the threshold value thereof, or a time-period in which the period signal is lower than the threshold thereof, to ON-duty or OFF-duty, it is possible for the duty ratio of the temperature control signal to change depending on the temperature.

The temperature control signal generator, by setting at least one of an upper limiting value and a lower limiting value of the temperature detection voltage, sets at least one of the maximum value and the minimum value for the duty ratio of the temperature control signal.

By setting the maximum value or the minimum value for the duty ratio of the temperature control signal, it is possible to individually set the frequency of the motor in a high temperature state or in a low temperature state.

The motor driving apparatus may be further provided with a minimum frequency control signal generator which generates a pulse signal whose duty ratio is set to correspond with a minimum frequency of the motor, and a frequency detector which detects the frequency of the motor. The signal synthesizer may change to a minimum frequency fixed mode, when the frequency of the motor decreases to a predetermined threshold value, and may synthesize the pulse signal and the temperature control signal whose duty ratio is fixed.

The frequency of the motor is monitored, and when the number is less than the predetermined threshold value, using the pulse signal corresponding to the minimum frequency, instead of the external control signal, by fixing the duty ratio of the temperature control signal, it is possible to fix the minimum frequency of the motor and to drive the motor stably.

The signal synthesizer, in the minimum frequency fixed mode which fixes the motor at a minimum frequency, may repeat, at a predetermined time ratio, a first time-period in which a pulse signal that sets the minimum frequency and a temperature control signal whose duty ratio is fixed are synthesized, and a second time-period in which the external control signal and a temperature control signal whose duty ratio is fixed are synthesized.

In the minimum frequency fixed mode, by driving the motor using the external control signal, it is possible to reflect the duty ratio of the external control signal in the minimum frequency fixed mode. As a result, when the duty ratio of the external control signal becomes high, the frequency of the motor gradually increases, to be higher than the predetermined threshold value, and it is possible to return to a normal drive mode.

When the temperature becomes higher than a predetermined threshold value, the signal synthesizer may return from the minimum frequency fixed mode to the normal drive mode in which the external control signal and the temperature control signal dependent on the temperature are synthesized.

Another embodiment of the present invention is a cooling apparatus. This apparatus is provided with a fan motor and a motor driving apparatus which controls driving of the fan motor.

According to this embodiment, since the fan motor can be driven in accordance with temperature and an external control signal, it is possible to preferably cool an object that is to be cooled.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

First, an outline of a fan motor driving apparatus according to an embodiment of the present invention is described. The fan motor driving apparatus according to the present embodiment drives a fan motor arranged facing a CPU. In the fan motor driving apparatus, a pulse-width modulated external control signal designating frequency of the fan motor is inputted from outside, and the fan motor is driven based on the external control signal. Moreover, a temperature detection element is arranged near the CPU, and the fan motor driving apparatus reflects ambient temperature in driving the fan motor.

Below, a configuration of the fan motor driving apparatus and the cooling apparatus according to the present embodiment is described.

Figure 1:
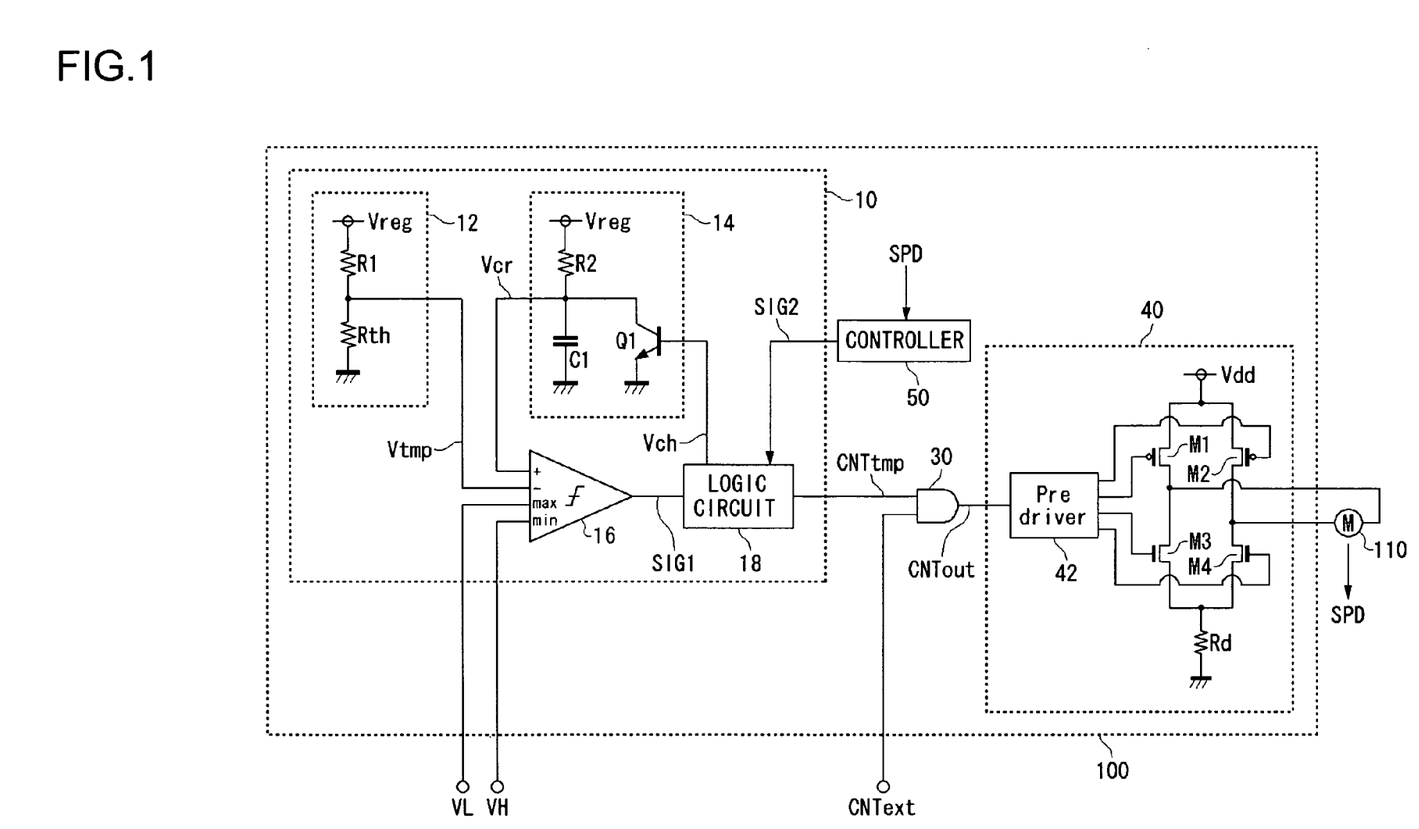
FIG. 1 shows a configuration of a cooling apparatus according to a first embodiment.

FIG. 1 shows a configuration of a cooling apparatus 1000 according to the first embodiment. The cooling apparatus 1000 is provided with a fan motor 110, and a fan motor driving apparatus 100 which controls the fan motor 110, and the fan motor 110 is driven at a frequency based on an external control signal CNText inputted from outside or the ambient temperature Ta, to cool the CPU that is an object of cooling.

The fan motor driving apparatus 100 includes a temperature control signal generator 10, a signal synthesizer 30, a drive controller 40, and a controller 50. The external control signal CNText which designates frequency of the fan motor 110 is inputted from outside, to the fan motor driving apparatus 100. The external control signal CNText is pulse-width modulated, and the frequency of the fan motor 110 is controlled according to a duty ratio thereof.

The controller 50 is a logic circuit which controls the entirety of the fan motor driving apparatus 100. A speed signal SPD indicating the frequency of the fan motor 110 is inputted to the controller 50. The frequency of the fan motor 110 is detected by a speed detector not shown in the figures. For example, the speed detector may perform speed detection using a Hall element, and may detect current flowing in the motor and convert to speed information. In the present embodiment, the speed signal SPD is a periodic signal having a frequency proportional to the frequency of the motor.

The temperature control signal generator 10 generates a pulse-modulated temperature control signal CNTtmp whose duty ratio changes depending on the ambient temperature Ta of the CPU that is the object of cooling. This temperature control signal generator 10 includes a temperature detector 12, a CR circuit 14, a first voltage comparator 16, and a logic circuit 18.

The temperature detector 12 detects the ambient temperature Ta, and generates a temperature detection voltage Vtmp having a voltage value that depends on the ambient temperature Ta. The temperature detector 12 includes a serially connected first resistor R1 and a thermistor Rth, and a stabilized constant voltage Vreg is applied to these resistances. The thermistor Rth is arranged near the CPU that is the object of cooling, and the resistance value thereof changes according to the ambient temperature Ta. The temperature detector 12 outputs voltage of a connection point of the first resistor R1 and the thermistor Rth as the temperature detection voltage Vtmp. The temperature detection voltage Vtmp is given by $Vtmp=Vreg \times Rth/(R1+Rth)$, using a constant voltage Vreg and the resistance values of the first resistor R1 and the thermistor Rth. The resistance value of the thermistor Rth has a negative temperature characteristic, and when the ambient temperature Ta rises, the resistance value decreases.

The temperature detection voltage Vtmp, for which the voltage value decreases with increase of the ambient temperature Ta, is outputted from the temperature detector 12 configured as above.

The CR circuit 14 generates a periodic voltage Vcr with a sawtooth wave pattern, having a frequency proportional to the frequency of the motor. The CR circuit 14 includes a second resistor R2, a first capacitor C1, and a first transistor Q1. The second resistor R2 and the first capacitor C1 are connected in series, and a stabilized constant voltage Vreg is applied. The CR circuit 14 outputs voltage of a connection point of the first capacitor C1 and the second resistor R2 as a periodic voltage Vcr.

A collector terminal of the first transistor Q1 is connected to a connection point of the first capacitor C1 and the second resistor R2, and a charge-discharge control signal Vch outputted from the logic circuit 18 is inputted to a base terminal. In a time-period in which the charge-discharge control signal Vch has a high level, since the first transistor Q1 is ON, charge accumulated in the first capacitor C1 is discharged, and the periodic voltage Vcr decreases.

In a time-period in which the charge-discharge control signal Vch has a low level, since the first transistor Q1 is OFF, the first capacitor C1 is charged by the constant voltage Vreg, and the periodic voltage Vcr increases with time.

The charge-discharge control signal Vch outputted from the logic circuit 18 to the base terminal of the first transistor Q1, is a periodic signal proportional to the frequency of the fan motor 110. Consequently, the periodic voltage Vcr generated by the CR circuit 14 is a periodic signal having a frequency proportional to the frequency of the fan motor 110.

The temperature detection voltage Vtmp and the periodic voltage Vcr are inputted to the first voltage comparator 16. The first voltage comparator 16 compares the two voltages, and when the periodic voltage Vcr is higher, outputs a high level, and when the temperature detection voltage Vtmp is higher, outputs a low level. An upper limiting voltage VH and a lower limiting voltage VL, which determine maximum value and minimum value of duty ratio of the temperature control signal, are additionally inputted to the first voltage comparator 16. In the first voltage comparator 16, when the temperature detection voltage Vtmp is higher than the upper limiting voltage VH, the temperature detection voltage Vtmp and the upper limiting voltage VH are compared, and when the temperature detection voltage Vtmp is lower than the lower limiting voltage VL, the temperature detection voltage Vtmp and the lower limiting voltage VL are compared.

The first voltage comparator 16 can be configured by combining a plurality of voltage comparators.

An output signal SIG1 of the first voltage comparator 16 and a periodic signal SIG2 proportional to the frequency of the fan motor 110 outputted from the controller 50 are inputted to the logic circuit 18, and the temperature control signal CNTtmp based on the two signals, is generated. In the logic circuit 18, in a time-period from when output from the first voltage comparator 16 is at a high level, to when a next periodic signal SIG2 is at a high level, the temperature control signal CNTtmp has a high level.

The temperature control signal CNTtmp generated in this way is outputted to the signal synthesizer 30.

The temperature control signal CNTtmp and the external control signal CNText are inputted to the signal synthesizer 30. This signal synthesizer 30 is an AND circuit, and outputs a logical product of the temperature control signal CNTtmp and the external control signal CNText, as a control signal CNTout.

The control signal CNTout outputted from the signal synthesizer 30 is inputted to the drive controller 40.

The drive controller 40 includes a driver circuit 42, switching transistors M1 to M4, and a detection resistor Rd, and drives the fan motor 110 based on a control signal CNT.

The switching transistors M1 to M4 are MOSFETS, performing a switching operation according to voltage applied to a gate terminal, and supplying a drive voltage intermittently to the fan motor 110. These switching transistors M1 to M4 make up a H-bridge circuit. By having the switching transistors M2 and M3 OFF, and synchronizing and turning ON and OFF the switching transistors M1 and M4, a supply voltage Vdd is applied to one terminal of the fan motor 110, and a voltage close to a ground voltage is applied to another terminal, and it is possible to rotate the fan motor 110 in a certain direction. The detection resistor Rd may convert a motor current flowing in the fan motor 110 into voltage, and may feed back to the driver circuit 42.

The driver circuit 42 controls ON and OFF states of the switching transistors M1 to M4 based on the control signal CNTout outputted from the signal synthesizer 30. In a time-period when the control signal CNTout has a high level, the driver circuit 42 turns ON a pair of the switching transistors M1 and M4, or a pair of M2 and M3, and applies a drive current to the fan motor 110. Consequently, when an ON time-period of the control signal CNTout is longer, a drive voltage is applied to the fan motor 110, and rotation is done at a large torque, that is, at a high frequency.

Operation of the fan motor driving apparatus 100 configured as above will be described.

The external control signal CNText having a duty ratio Dext is now inputted from outside, to the fan motor driving apparatus 100.

Figure 2:
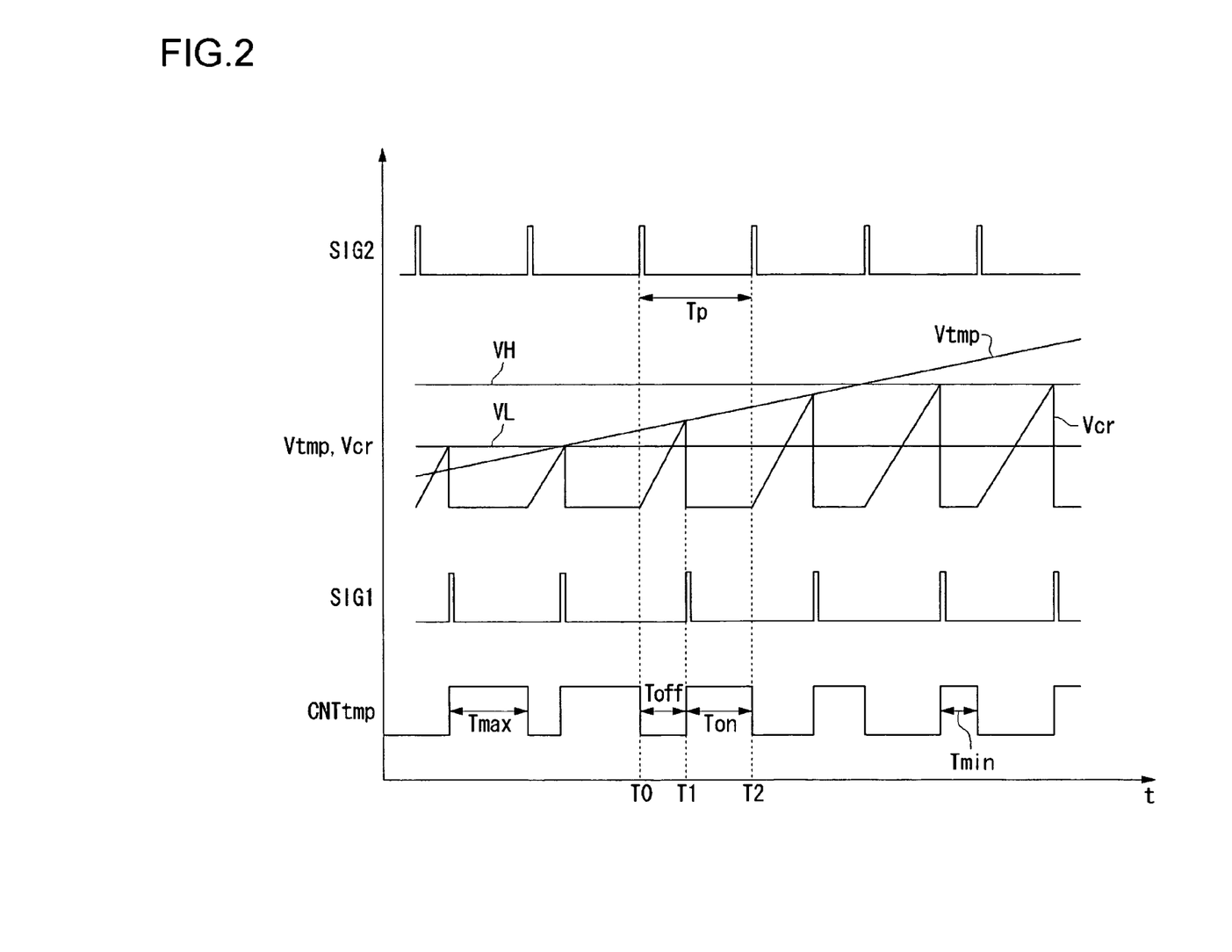
FIG. 2 shows a process of generating a temperature control signal by a temperature control signal generator.

FIG. 2 shows a process of generating the temperature control signal CNTtmp by the temperature control signal generator 10.

A periodic signal SIG2 is outputted from the controller 50 with a period proportional to the frequency of the fan motor 110. Cycle time of the periodic signal SIG2 is Tp.

At time T0, when the periodic signal SIG2 is inputted from the controller 50 to the logic circuit 18, the charge-discharge control signal Vch has a low level, the first transistor Q1 is OFF, and charging of the first capacitor C1 begins.

After that, the periodic voltage Vcr increases in accordance with a CR time constant, and reaches the temperature detection voltage Vtmp at time T1. When Vcr>Vtmp at time T1, the output signal SIG1 of the first voltage comparator 16 has a high level. When the output signal SIG1 of the first voltage comparator 16 has a high level, the logic circuit 18 switches the charge-discharge control signal Vch to a high level, and discharges the first capacitor C1. The periodic voltage Vcr decreases due to the discharge of the first capacitor C1.

At time T2 at which a cycle time Tp of the periodic signal SIG2 has passed from time T1, the periodic signal SIG2 again has a high level, the first transistor Q1 is OFF, and charging of the first capacitor C1 begins.

With regard to the logic circuit 18, in the time-period from when the output signal SIG1 of the first voltage comparator 16, shown as Ton in the figure, goes to a high level, until the next periodic signal SIG2 goes to a high level, the temperature control signal CNTtmp has a high level. The duty ratio of this temperature control signal CNTtmp is given by Ton/Tp, and this duty ratio becomes smaller as the temperature detection voltage Vtmp becomes higher.

As described above, the temperature detection voltage Vtmp becomes lower, as the ambient temperature Ta increases. Consequently, the duty ratio of the temperature control signal CNTtmp becomes larger as the temperature increases.

In the first voltage comparator 16, when the temperature detection voltage Vtmp is higher than the upper limiting voltage VH, since the periodic voltage Vcr and the upper limiting voltage VH are compared, the ON time-period of the temperature control signal CNTtmp is fixed at Tmin, and the duty ratio is fixed at a minimum duty ratio Dmin. Furthermore, when the temperature detection voltage vtmp is lower than the lower limiting voltage VL, the ON time-period of the temperature control signal CNTtmp is fixed at Tmax, and the duty ratio is fixed at a maximum duty ratio Dmax.

In this way, the duty ratio of the temperature control signal CNTtmp is included in a range of an upper limiting value and a lower limiting value set by the upper limiting voltage VH and the lower limiting voltage VL.

Figure 3:
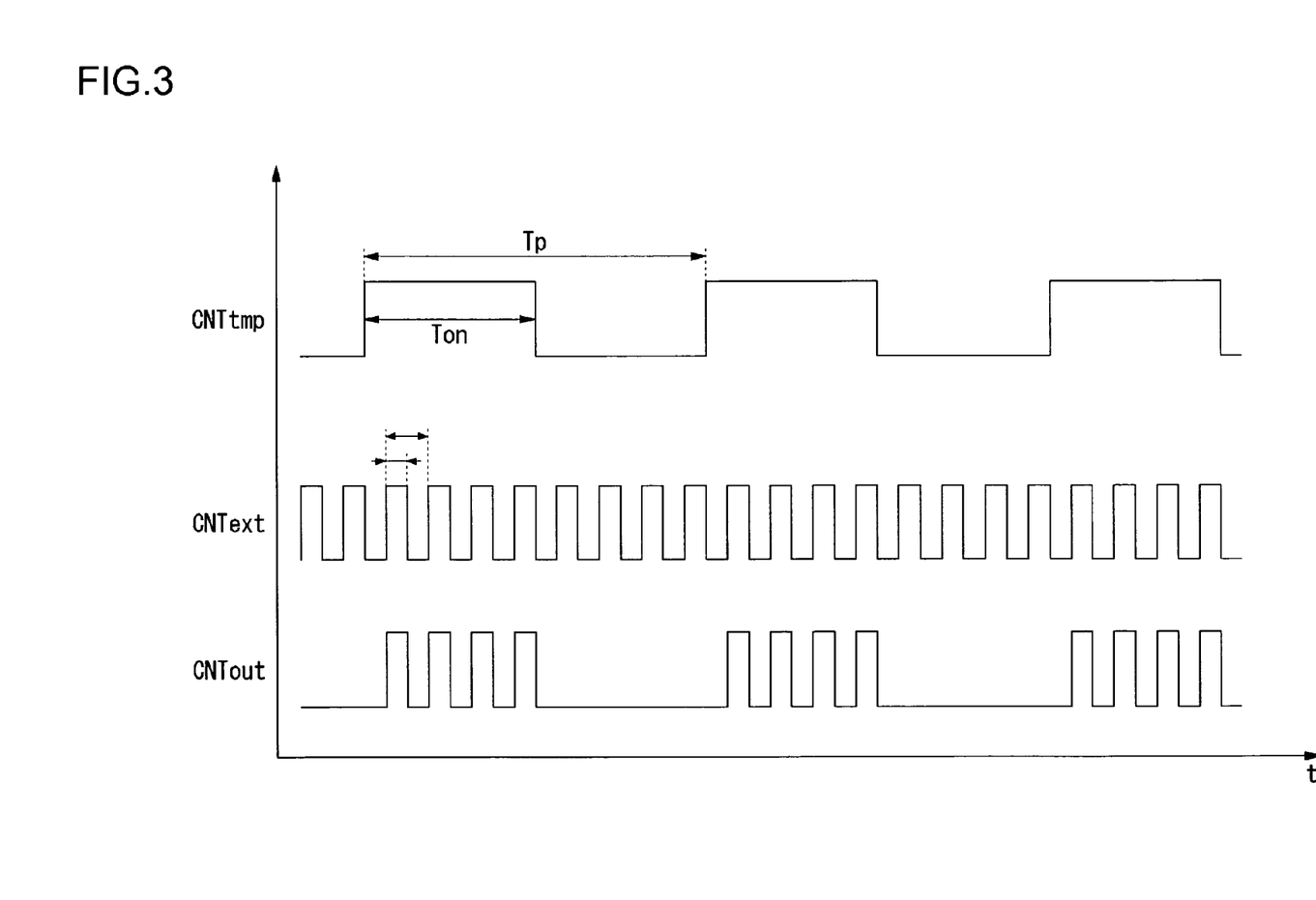
FIG. 3 shows a time chart of an input and output signal of a signal synthesizer.

FIG. 3 shows a time chart of an input and output signal of the signal synthesizer 30. A time axis is enlarged and contracted for each signal to facilitate viewing, and is different to an actual time scale. When the duty ratio of the temperature control signal CNTtmp is Dtmp, and the duty ratio of the external control signal CNText is Dext, pulse density Dcnt of a control signal CNTout outputted from the signal synthesizer 30 is given by Dcnt=Dtmp×Dext. For example, when the duty ratio Dtmp of the temperature control signal CNTtmp is 50%, and the duty ratio Dext of the external control signal CNText is 60%, the pulse density of the control signal CNT is 30%.

Figure 4:
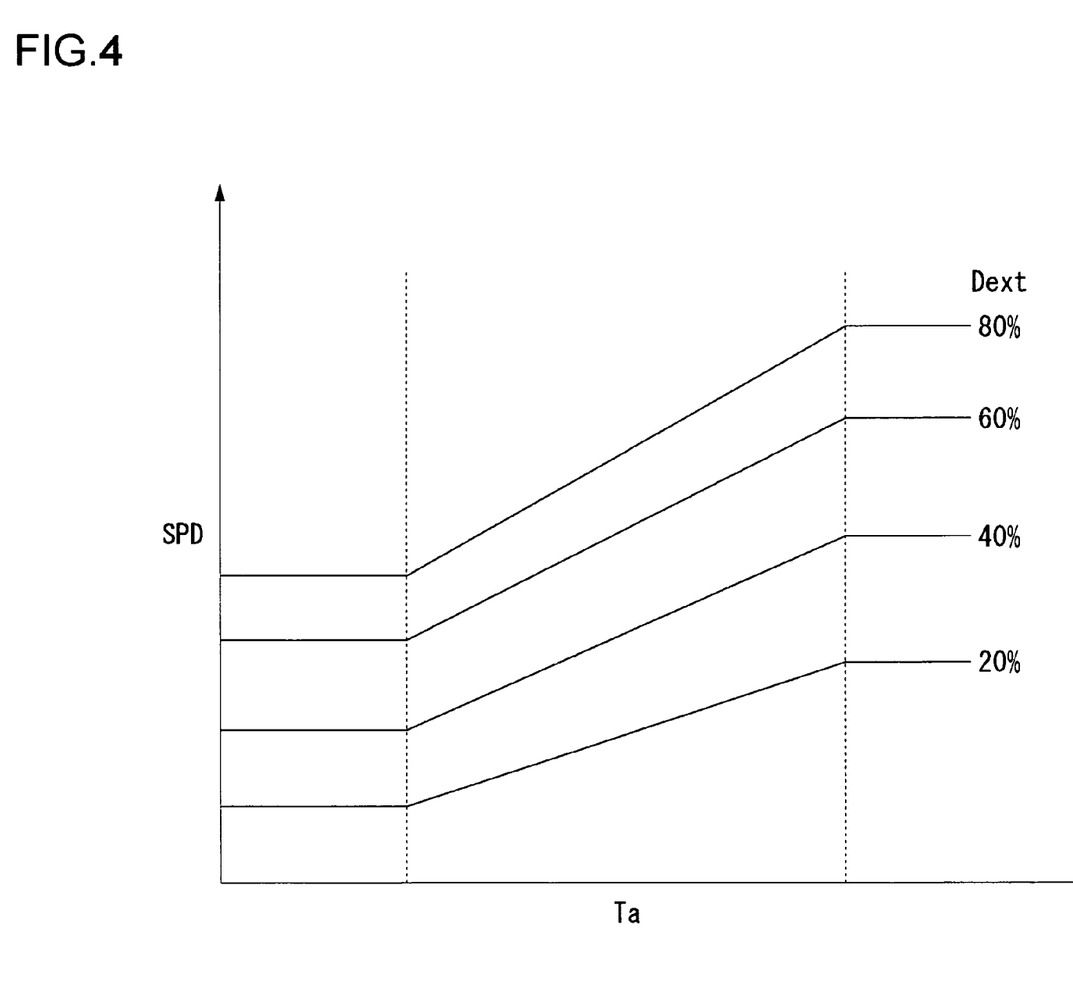
FIG. 4 shows relationships of frequency of a fan motor and ambient temperature of a fan motor driving apparatus of FIG. 1.

FIG. 4 shows relationships of the ambient temperature Ta and the frequency SPD of the fan motor, with the duty ratio Dext of the external control signal as a parameter. When the duty ratio Dext of the external control signal CNText is constant, since the ambient temperature Ta increases and, with the temperature increase, the duty ratio of the control signal CNTout becomes large, voltage application time of the fan motor 110 increases, and the frequency also increases. When the ambient temperature Ta reaches a predetermined upper limiting value Tamax, since the duty ratio of the temperature control signal CNTtmp is fixed, the frequency of the fan motor 110 is no longer dependent on the temperature. In the same way, also in cases in which the ambient temperature Ta decreases to a predetermined lower limiting value Tamin, since the duty ratio of the temperature control signal CNTtmp is fixed at a minimum value, the frequency of the fan motor 110 is no longer dependent on the temperature.

In this way, when the ambient temperature Ta of the CPU, which is the object of cooling, is high, the fan motor 110 is driven at a high frequency, and cooling level is raised; conversely, when the ambient temperature Ta is low, driving is done at a low frequency, and the level of cooling is diminished.

According to the fan motor driving apparatus 100 according to the present embodiment, it is possible to drive the fan motor 110 for cooling the CPU at a frequency that reflects the ambient temperature Ta in the external control signal CNText.

Furthermore, in the temperature control signal generator 10, by setting the upper limiting value Dmax and the lower limiting value Dmin of the duty ratio Dtmp of the temperature control signal CNTtmp, it is possible to drive the fan motor 110 at an appropriate frequency for a high temperature and for a low temperature.

Second Embodiment

In a fan motor driving apparatus according to a second embodiment a function is added to the fan motor driving apparatus according to the abovementioned first embodiment, which monitors the frequency and drives at a minimum frequency when a predetermined condition is fulfilled. The fan motor driving apparatus according to the present embodiment switches between a minimum frequency fixed mode which fixes the frequency of the fan motor to a predetermined minimum frequency, and a normal drive mode in which the frequency changes based on an external control signal and ambient temperature.

Figure 5:
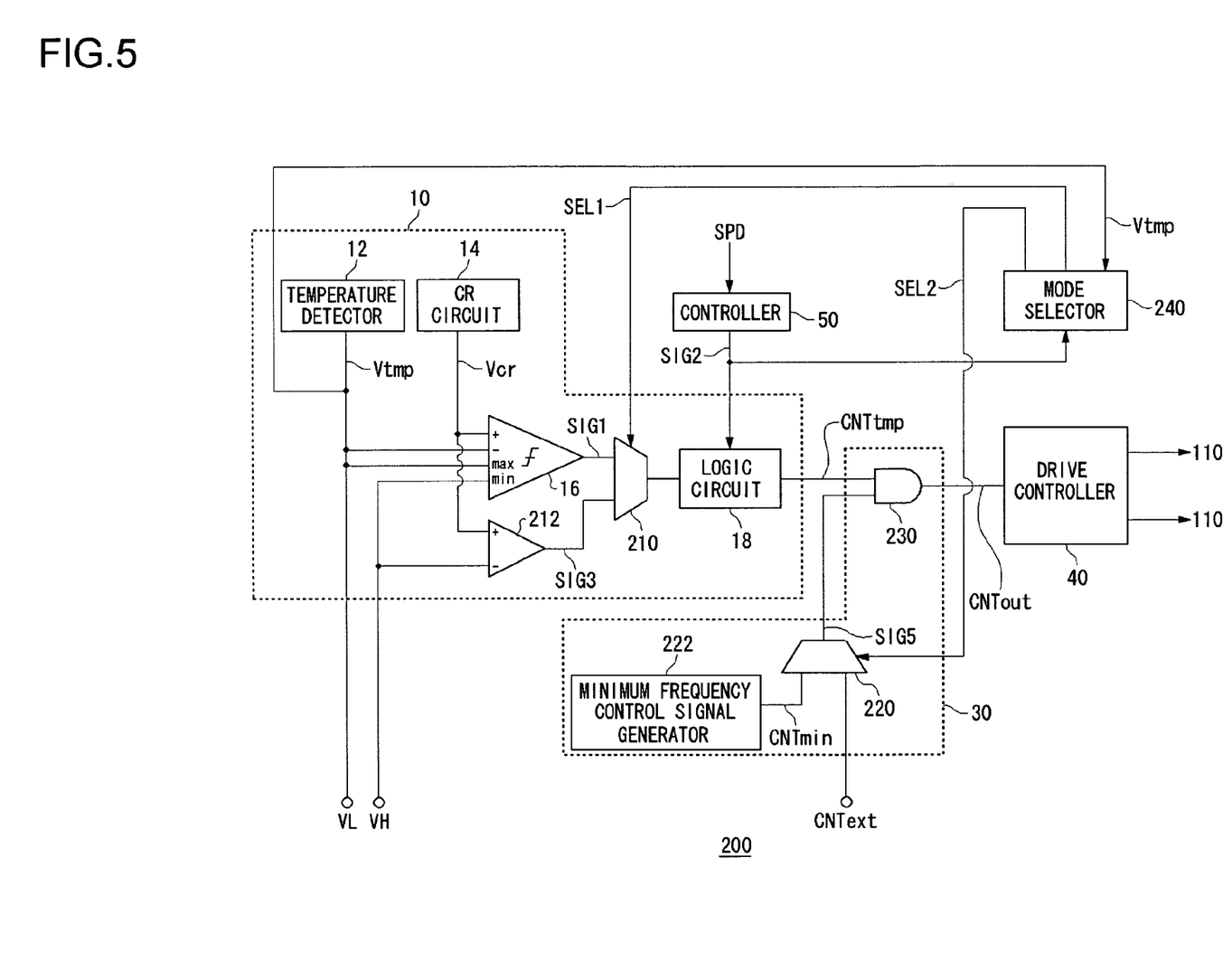
FIG. 5 is a circuit diagram showing a configuration of a fan motor driving apparatus according to a second embodiment.

FIG. 5 is a circuit diagram showing a configuration of the fan motor driving apparatus 200 according to the second embodiment.

The fan motor driving apparatus 200 includes a temperature control signal generator 10, a signal synthesizer 30, a drive controller 40, a controller 50, and a mode selector 240.

The mode selector 240 detects the frequency of the fan motor 110, and switches between the normal drive mode and the minimum frequency fixed mode, based on the detected frequency, a periodic signal SIG2, and the ambient temperature Ta. The mode selector 240 outputs a first selection signal SEL1 and a second selection signal SEL2, respectively, to the temperature control signal generator 10 and the signal synthesizer 30.

The temperature control signal generator 10 includes a temperature detector 12, a CR circuit 14, a first voltage comparator 16, a first selector 210, a second voltage comparator 212, and a logic circuit 18.

The second voltage comparator 212 compares a periodic voltage Vcr outputted from the CR circuit 14 and a lower limiting voltage VL. A temperature control signal SIG3 whose duty ratio is fixed at a minimum value is outputted from the second voltage comparator 212.

An output signal SIG1 of the first voltage comparator 16 and an output signal SIG3 of the second voltage comparator 212 are inputted to the first selector 210, and any one thereof is selected and outputted, based on the first selection signal SEL1 outputted from the mode selector 240.

The logic circuit 18 generates a temperature control signal CNTtmp, based on an output signal of the first selector 210.

The signal synthesizer 30 includes an AND circuit 230, a second selector 220, and a minimum frequency control signal generator 222. The minimum frequency control signal generator 222 generates a minimum frequency control signal CNTmin that is a pulse signal whose duty ratio is set corresponding to the minimum frequency of the motor.

The minimum frequency control signal CNTmin and the external control signal CNText are inputted to the second selector 220, and any one thereof is selected and outputted based on the second selection signal SEL2 outputted from the mode selector 240.

The temperature control signal CNTtmp outputted from the temperature control signal generator 10 and a control signal SIG5 outputted from the second selector 220 are inputted to an AND circuit 230, and a logical product of the two input signals is outputted.

Figure 6:
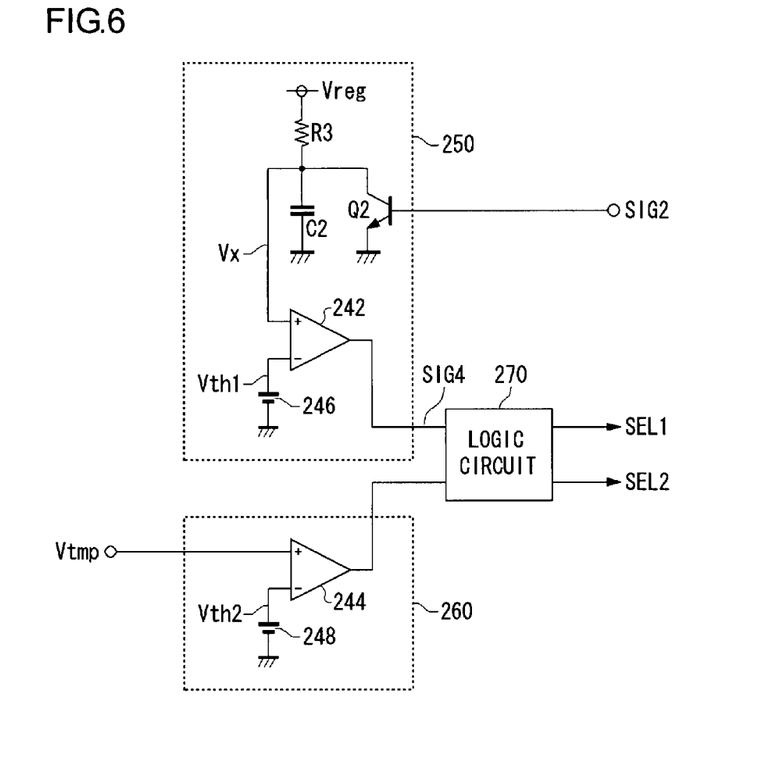
FIG. 6 is a circuit diagram showing a configuration of a mode selector of FIG. 5.

FIG. 6 is a circuit diagram showing a configuration of the mode selector 240. The mode selector 240 includes a frequency detector 250, a temperature detector 260, and a logic circuit 270.

The frequency detector 250 monitors the frequency of the fan motor 110, and detects when this goes below a predetermined frequency. The frequency detector 250 includes a third resistor R3, a second capacitor C2, a second transistor Q2, a third voltage comparator 242, and a first voltage supply 246.

The third resistor R3 and the second capacitor C2 are connected in series, and the second transistor Q2 is arranged in parallel to the second capacitor C2. The periodic signal SIG2 is inputted to a base terminal of the second transistor Q2.

Figure 7:
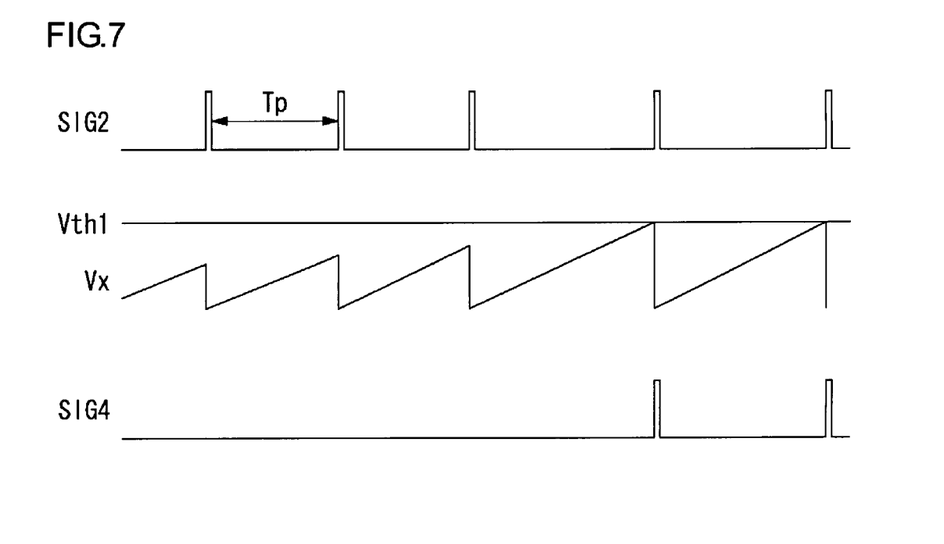
FIG. 7 is a time chart showing an operation state of a frequency detector.

FIG. 7 is a time chart showing operation of the frequency detector 250.

When the periodic signal SIG2 has a high level, the second transistor Q2 is ON, the second capacitor C2 is discharged, and the voltage Vx decreases. During a cycle time Tp in which the periodic signal SIG2 has a low level, since the second transistor Q2 is OFF, the second capacitor C2 is charged, and the voltage Vx increases.

The third voltage comparator 242 compares a threshold voltage Vth1 generated by the first voltage supply 246, and the voltage Vx occurring in the second capacitor.

Since the frequency of the periodic signal SIG2 is proportional to the frequency of the fan motor 110, the lower the frequency of the fan motor 110, the longer the cycle time Tp thereof. As a result, since the lower the frequency of the fan motor 110 the longer the charge time of the second capacitor C2, the voltage attained by the voltage Vx becomes higher.

The output signal SIG4 of the third voltage comparator 242 has a high level when Vx>Vth1, and has a low level when Vx<Vth1. The frequency detector 250, by detecting that the voltage Vx has reached a threshold voltage Vth1, detects that the frequency of the fan motor 110 has decreased to a predetermined minimum frequency.

The description returns to FIG. 6. The temperature detector 260 is provided with a second voltage supply 248 and a fourth voltage comparator 244, and by comparing the temperature detection signal Vtmp and a predetermined threshold voltage Vth2, detects that the ambient temperature Ta is higher than a predetermined threshold value.

The logic circuit 270 switches between the minimum frequency fixed mode and the normal drive mode, based on output of the frequency detector 250 and the temperature detector 260.

When the frequency of the fan motor 110 decreases and becomes lower than the predetermined threshold value, output from the frequency detector 250 is at a high level. While output from the frequency detector 250 is at a high level, the logic circuit 270 outputs the first selection signal SEL1 and the second selection signal SEL2, corresponding to the minimum frequency fixed mode.

Furthermore, when the temperature detector 260 detects that the ambient temperature Ta has become higher than the predetermined threshold value, the logic circuit 270 releases the minimum frequency fixed mode, and outputs the first selection signal SEL1 and the second selection signal SEL2, corresponding to the normal drive mode.

Returning to FIG. 5, operation of the fan motor driving apparatus 200 according to the present embodiment is described.

In the normal drive mode, the output signal SIG1 of the first voltage comparator 16 is selected, by the first selection signal SEL1, as output of the first selector 210. Moreover, the external control signal CNText is selected, by the second selection signal SEL2, as output of the second selector 220. As a result, in the normal drive mode, the signal synthesizer 30 synthesizes the external control signal CNText and the temperature control signal CNTtmp that depends on the ambient temperature Ta, and the fan motor driving apparatus 200 drives the fan motor 110 based on the external control signal CNText and the ambient temperature Ta.

In the minimum frequency fixed mode, the output signal SIG3 of the second voltage comparator 212 is selected, by the first selection signal SEL1, as output of the first selector 210. Moreover, the minimum frequency control signal CNTmin is selected, by the second selection signal SEL2, as output of the second selector 220. As a result, in the minimum frequency fixed mode, the signal synthesizer 30 synthesizes the minimum frequency control signal CNTmin and the temperature control signal CNTth whose duty ratio is fixed at a minimum value, and the fan motor driving apparatus 200 drives the fan motor 110 at the predetermined minimum frequency.

Figure 8:
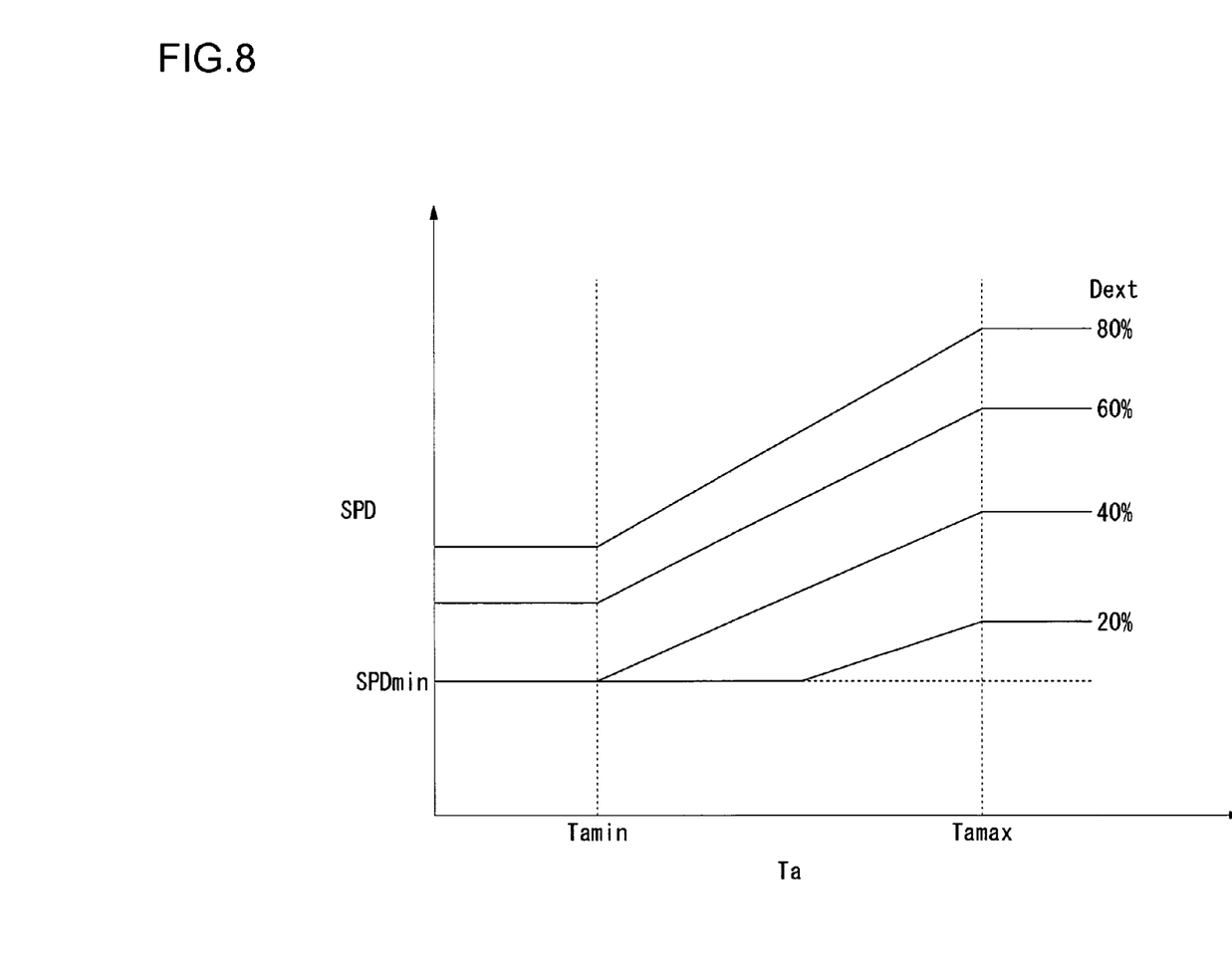
FIG. 8 shows relationships of frequency of the fan motor and ambient temperature of the fan motor driving apparatus of FIG. 5.

FIG. 8 shows, for a fan motor driving apparatus according to the present embodiment, relationships of the ambient temperature and the frequency of the fan motor, ambient temperature Ta and duty ratio Dext of the external control signal being parameters. When the duty ratio Dext of the external control signal CNText is constant, since the ambient temperature Ta increases and, with the temperature increase, the duty ratio of the control signal CNTout becomes large, voltage application time of the fan motor 110 increases, and the frequency also increases. When the ambient temperature Ta reaches a predetermined upper limiting value Tamax, since the duty ratio of the temperature control signal CNTtmp is fixed, the frequency of the fan motor 110 is no longer dependent on the temperature. In the same way, also in cases in which the ambient temperature Ta decreases to a predetermined lower limiting value Tamin, since the duty ratio of the temperature control signal CNTtmp is fixed at a minimum value, the frequency of the fan motor 110 is no longer dependent on the temperature.

In the fan motor driving apparatus 100 according to the present embodiment, when the duty ratio Dext of the external control signal CNText or the ambient temperature Ta decreases, and the frequency of the fan motor 110 reaches a predetermined minimum frequency SPDmin, since there is a transition to the minimum frequency fixed mode, the frequency of the fan motor 110 does not decrease to the minimum frequency SPDmin or less.

In this way, according to the fan motor driving apparatus 200 according to the present embodiment, it is possible to fix the minimum frequency and to perform strict control of the frequency.

In the minimum frequency fixed mode, since the frequency of the fan motor 110 is fixed at the minimum frequency, there is a transition to the minimum frequency fixed mode once, and until the ambient temperature Ta rises to a predetermined threshold voltage, there is no return to the normal mode.

Consequently, in order to perform a return from the minimum frequency fixed mode to the normal drive mode by the external control signal CNText, output of the second selector 220 may be switched with a predetermined time ratio of the minimum frequency control signal CNTmin and the external control signal CNText.

Figure 9:
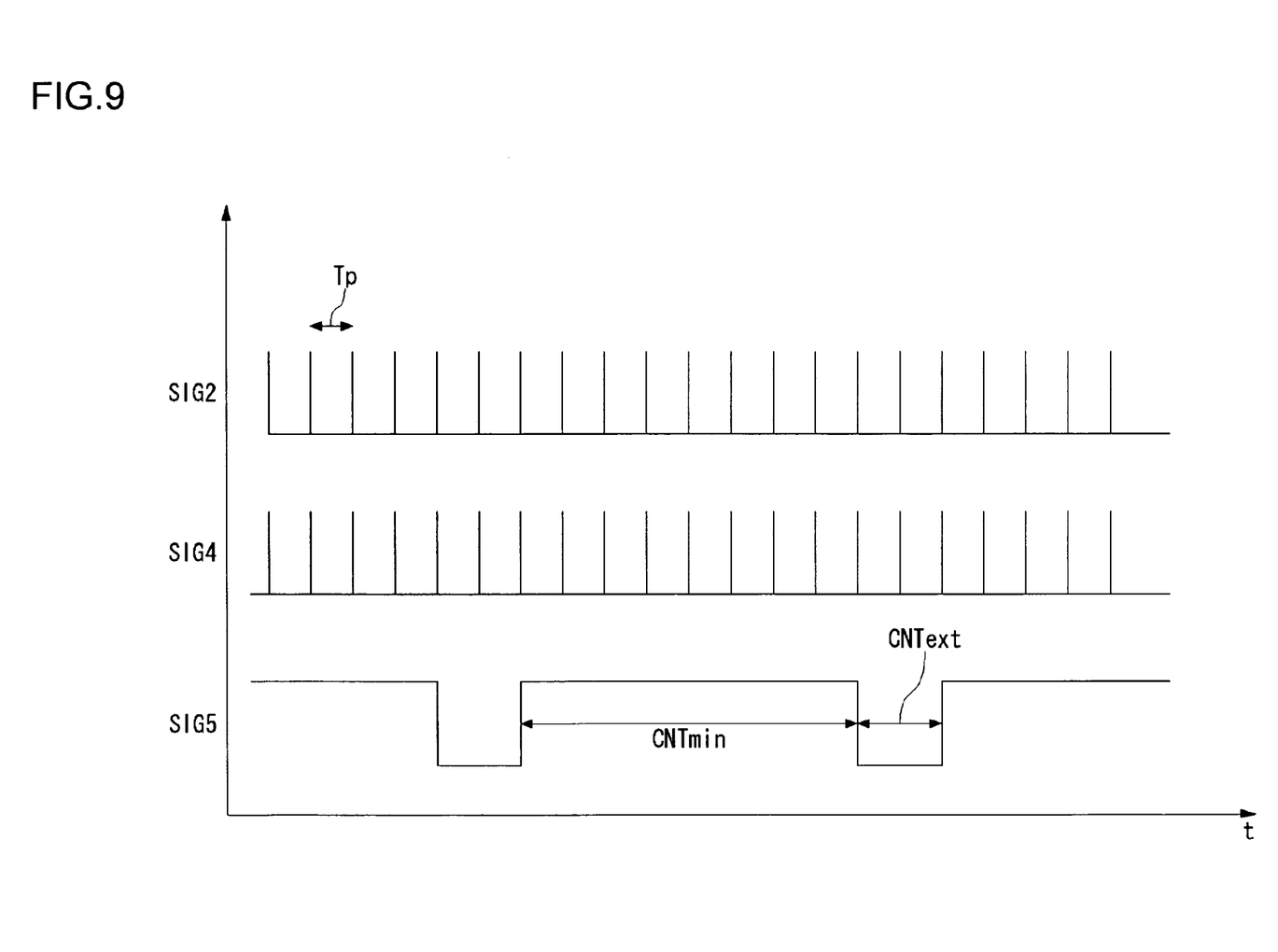
FIG. 9 is a time chart showing an operation state of the fan motor driving apparatus in a minimum frequency fixed mode.

FIG. 9 is a time chart showing an operation state of the fan motor driving apparatus 200 in a minimum frequency fixed mode. The mode selector 240, in the minimum frequency fixed mode, switches the minimum frequency control signal CNTmin and the external control signal CNText, at a time ratio of 8:2.

As a result, in the minimum frequency fixed mode, when the duty ratio Dext of the external control signal CNText becomes large, the frequency of the fan motor 110 gradually increases, so that, when higher than a predetermined frequency, it is possible to return to the normal drive mode.

In this way, in the minimum frequency fixed mode, by reflecting the duty ratio of the external control signal CNText, it is possible to return from the minimum frequency fixed mode to the normal drive mode, by not only the ambient temperature Ta, but by the external control signal CNText.

The abovementioned embodiments are examples; various modified examples in combinations of various component elements and various processes thereof are possible, and a person skilled in the art will understand that such modified examples are within the scope of the present invention.

In the embodiments, descriptions have been given concerning cases in which the fan motor, which is to be cooled, is a single phase drive motor, but there is no limitation to this, and the fan motor may use another motor, such as, for example, a two-phase drive motor.

In the present embodiments a description has been given concerning cases in which the thermistor Rth used in the temperature control signal generator 20 has a negative temperature characteristic; however, a posistor having a positive temperature characteristic is also possible. In such a case, positions of the first resistor R1 and the thermistor Rth may be switched.

In the embodiments, a description has been given concerning cases in which the drive controller 40 of the fan motor 110 is a H-bridge circuit, but there is no limitation to this, and another drive control circuit may be used.

Furthermore, high level and low-level settings of various signals in each of the circuits according to the embodiments are examples, and reversed logical values are clearly also included in the technological scope of the present invention.

In the embodiments, all of the elements of which the fan motor driving apparatus 100 is configured may be integrated in one unit, or may be configured to be divided among separate integrated circuits, and furthermore, the configuration may be such that some of members are discrete parts. Decisions as to which part is integrated may be taken in accordance with cost, space occupied, usage, and the like.

While the preferred embodiments of the present invention have been described using specific terms, such description is for illustrative purposes only, and it is to be understood that changes and variations may be made without departing from the spirit or scope of the appended claims.

The invention claimed is:

1. A motor driving apparatus which drives a motor based on a external control signal inputted from outside, the motor driving apparatus comprising:
   a temperature control signal generator which generates a pulse-modulated temperature control signal whose duty ratio changes depending on temperature;
   a signal synthesizer which synthesizes the external control signal and the temperature control signal; and
   a drive controller which drives the motor based on output of the signal synthesizer;
   wherein the external control signal is pulse-modulated according to a target frequency of the motor; and
   wherein the temperature control signal generator comprises:
      a periodic signal generator which generates a periodic voltage whose frequency is proportional to frequency of the motor;
      a temperature detector which generates a temperature detection voltage that changes depending on temperature;
      a voltage comparator which compares the periodic voltage and the temperature detection voltage; and
      a logic circuit which receives an output of the voltage comparator and a periodic signal frequency of which is proportional to the frequency of the actual frequency of the motor, and generates the temperature control signal which has a high level in a period from when the output of the voltage comparator becomes high, to when the periodic signal becomes high;
   wherein the temperature control signal generator generates the temperature control signal based on output of the voltage comparator.

2. A motor driving apparatus according to claim 1, wherein the temperature control signal generator sets at least one of a maximum value and a minimum value for a duty ratio of the temperature control signal, by setting at least one of an upper limiting value and a lower limiting value of the temperature detection voltage.

3. A motor driving apparatus according to claim 1, further comprising:
   a minimum frequency control signal generator which generates a pulse signal whose duty ratio is set to correspond with a minimum frequency of the motor; and
   a frequency detector which detects the frequency of the motor;
   wherein the signal synthesizer changes to a minimum frequency fixed mode, when the frequency of the motor decreases to a predetermined threshold value, and synthesizes the pulse signal and the temperature control signal whose duty ratio is fixed.

4. A motor driving apparatus according to claim 3, wherein the signal synthesizer, in the minimum frequency fixed mode, repeats, at a predetermined time ratio, a first time-period in which the pulse signal and the temperature control signal whose duty ratio is fixed are synthesized, and a second time-period in which the external control signal and the temperature control signal, whose duty ratio is fixed, are synthesized.

5. A motor driving apparatus according to claim 3, wherein, when temperature becomes higher than a predetermined threshold value, the signal synthesizer returns from the minimum frequency fixed mode to the normal drive mode in which the external control signal and the temperature control signal, which is dependent on the temperature, are synthesized.

6. A cooling apparatus comprising:
   a fan motor; and
   a motor driving apparatus according to claim 1, which controls driving of the fan motor.

7. A motor driving apparatus according to claim 1, wherein the temperature control signal generator further includes a CR circuit having a capacitor, which generates the periodic voltage by repeating a charge state and a discharge state, and wherein the logic circuit makes the CR circuit the charge state when the output of the voltage comparator becomes high, and makes the CR circuit the discharge state when the periodic signal becomes high.

8. A motor driving apparatus according to claim 1, further comprising:
   a controller which receives a speed signal indicating an actual frequency of the motor from a speed detector and generates the periodic signal whose frequency is proportional to the frequency of the motor.

* * * * *